(12) United States Patent
Kozey

(10) Patent No.: US 7,794,589 B2
(45) Date of Patent: Sep. 14, 2010

(54) FLOATING SUCTION HEAD ASSEMBLY

(75) Inventor: Gregory Kozey, Eastford, CT (US)

(73) Assignee: Kochek Company, Inc., Putnam, CT (US)

( * ) Notice: Subject to any disclaimer, the term of this patent is extended or adjusted under 35 U.S.C. 154(b) by 85 days.

(21) Appl. No.: 12/205,093

(22) Filed: Sep. 5, 2008

(65) Prior Publication Data

US 2010/0059432 A1  Mar. 11, 2010

(51) Int. Cl.
*B01D 35/05* (2006.01)
(52) U.S. Cl. ............... 210/122; 210/170.05; 210/242.1; 210/461; 405/127
(58) Field of Classification Search .................. 210/122, 210/170.05, 242.1, 460, 461, 462; 405/127
See application file for complete search history.

(56) References Cited

U.S. PATENT DOCUMENTS

| 1,579,917 | A | * | 4/1926 | Deming | 210/242.1 |
| 2,597,728 | A | * | 5/1952 | Hink | 210/242.1 |
| 2,957,579 | A | * | 10/1960 | McCombie | 210/242.1 |
| 3,109,812 | A | * | 11/1963 | McAulay et al. | 210/242.1 |
| 4,017,394 | A | * | 4/1977 | Hensley | 210/242.1 |
| 4,179,379 | A | * | 12/1979 | Mitchell | 210/242.1 |
| 4,647,374 | A | | 3/1987 | Ziaylek | |
| 4,973,405 | A | | 11/1990 | Kozey | |
| 5,820,751 | A | * | 10/1998 | Faircloth, Jr. | 210/122 |

\* cited by examiner

*Primary Examiner*—Christopher Upton
(74) *Attorney, Agent, or Firm*—Michaud-Kinney Group LLP

(57) ABSTRACT

A floating suction head assembly for use with a hose, for drawing liquid into the hose. The assembly includes a float and a strainer rotatably mounted to the float. The strainer has a coupling portion for coupling to a hose.

11 Claims, 8 Drawing Sheets

US 7,794,589 B2

FLOATING SUCTION HEAD ASSEMBLY

FIELD OF THE INVENTION

This invention relates to floating suction head assemblies of the type employed for drawing water from an open body of water such as a pond, lake, stream, river, etc.

BACKGROUND

It is sometimes necessary to pump water from an open body of water such as a pond, a lake, a stream, etc., for purposes of firefighting, irrigation, etc., by drawing the water through a hose that has an intake end in the body of water. Such bodies of water often contain debris, such as leaves, twigs, fish, etc., that interfere with the operation of the pump or that are simply unwanted in the water being pumped. It is known to provide a strainer on the intake end of the hose to prevent debris from entering the hose. To reduce the introduction of silt or other unwanted matter from the bottom of the body of water, the intake end of the hose can be attached to a suction head assembly that includes the strainer and a float to keep the intake end of the hose near the water surface. However, it is necessary to avoid drawing air into the hose, since air reduces the efficiency of the pumping operation and, depending on the pump, may cause the pump to lose its prime and thereby become inoperable.

U.S. Pat. No. 4,647,374 to Michael P. Ziaylek et al discloses a suction head assembly of the type mentioned. The suction head assembly comprises a pan secured onto a hose, the pan having an open mesh wire screen and being securable to a float.

U.S. Pat. No. 4,973,405 to Kozey discloses a floating suction head assembly for connection with fire hoses and the like. The assembly comprises a U-shaped float of hollow tubular construction. A tubular strainer is disposed between the arms of the float and has small openings along the bottom and side portions of the strainer for admitting water, but to avoid drawing air into the strainer, there are no openings on the top of the strainer. The strainer is pivotably connected to the float for pivoting motion about an axis that is perpendicular to the central axis of the strainer.

SUMMARY OF THE INVENTION

The present invention resides in one aspect in a floating suction head assembly for use with a hose for drawing liquid into the hose. The assembly comprises a float and a strainer rotatably secured to the float. The strainer has a coupling portion for coupling to a hose.

DETAILED DESCRIPTION OF THE INVENTION

This invention provides a floating suction head assembly for attachment to a hose for use in drawing water from an open body of water in a pumping operation, for firefighting purposes, irrigation purposes, etc. The assembly comprises a float and a strainer mounted to the float. The hose is attached to the strainer, and the suction head assembly is placed in a body of water in which the assembly floats. The strainer strains water drawn into the hose, and the float allows the strainer to remain under the surface of the water, but keeps the strainer from sinking to the bottom of the body of water. The strainer is secured to the float by a rotatable coupling (such as a bearing) to accommodate rotation of a hose relative to the float and thus relieve torque received via the hose. Such torque may be generated in a floating suction head assembly that lacks a rotatable coupling for the hose, if the assembly is placed in the water upside-down, in which case the stiffness of the hose can prevent the assembly from righting itself. It will be appreciated that the suction head assembly described herein can be used to draw fluids other than water.

Figure 1:
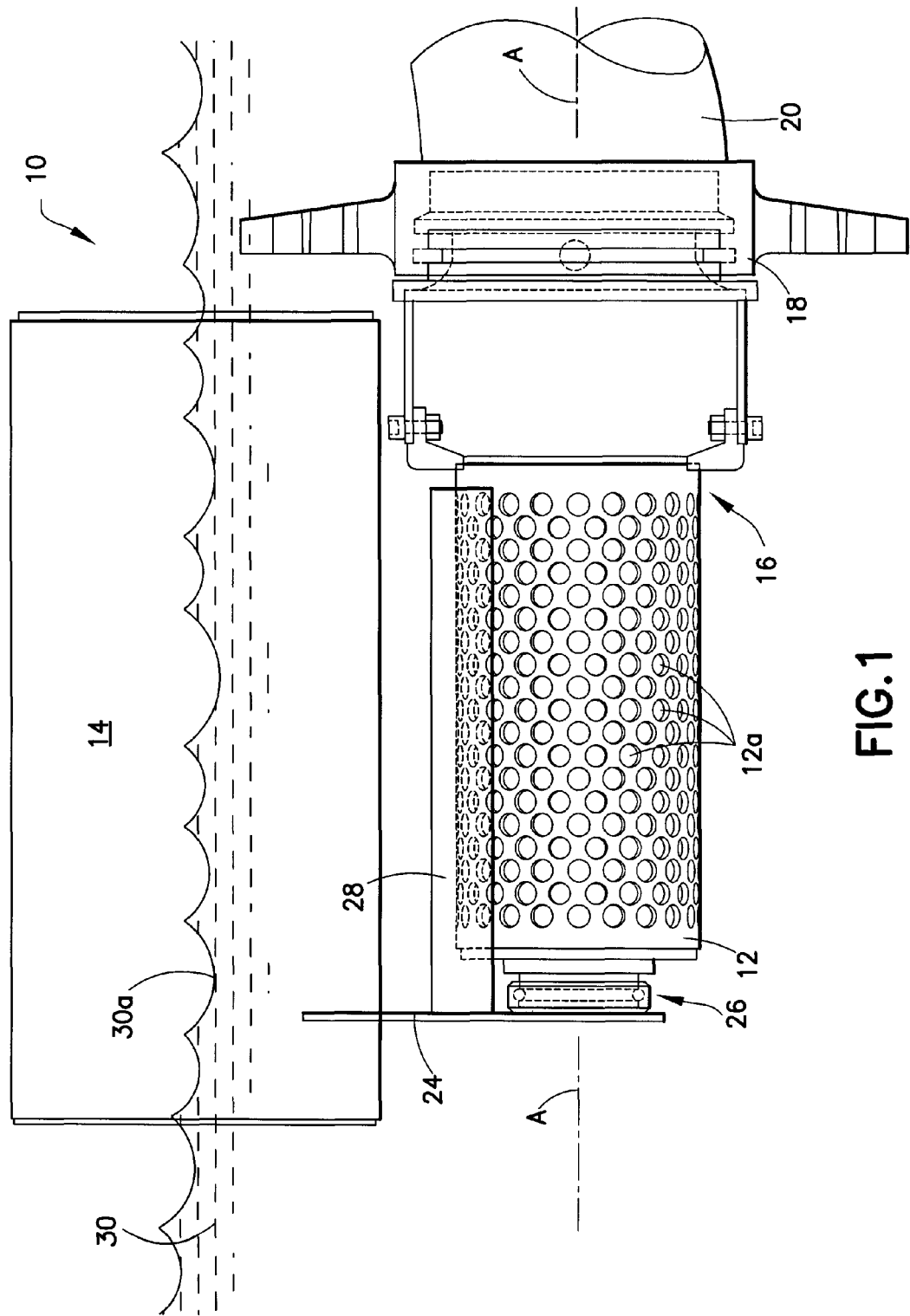
FIG. 1 is a schematic elevation view of a floating suction head assembly according to a specific embodiment of the invention, in a body of water.

As shown in FIG. 1, a floating suction head assembly according to a first embodiment of this invention, generally designated by the numeral 10, comprises a strainer 12 secured to a float 14. The float 14 is a buoyant body, for example, a hollow, rigid metal or plastic chamber, a solid buoyant material, or a pliable, inflatable floatation sac, or the like. In contrast, the strainer 12 is a non-buoyant body. The float 14 is sufficiently buoyant that it will float even with the strainer 12 attached thereto and with a length of hose secured to the floating suction head assembly 10 (hereinafter sometimes referred to as "assembly 10"). The strainer 12 has a coupling portion 16 for receiving a hose 20. The coupling portion 16 may include a coupler 18 for joining a hose to the strainer 12. The coupler 18 optionally may be any standard hose coupler such as a Storz coupler, a NST coupler, a barb shank, etc., for a standard fire hose, a garden hose, etc. The strainer 12 has a central axis A extending centrally through the strainer 12 and through the coupling portion 16. The strainer 12 has a generally cylindrical configuration and a plurality of perforations 12a around the entire circumference of the strainer.

A gusset member 24 extends from the float 14 to provide a mounting point for the strainer. Optionally, the strainer 12 is mounted on the gusset member 24 at a point on the central axis A opposite from the coupling portion 16, as shown in FIG. 1. The gusset member 24 is made from a non-buoyant material.

Figure 2:
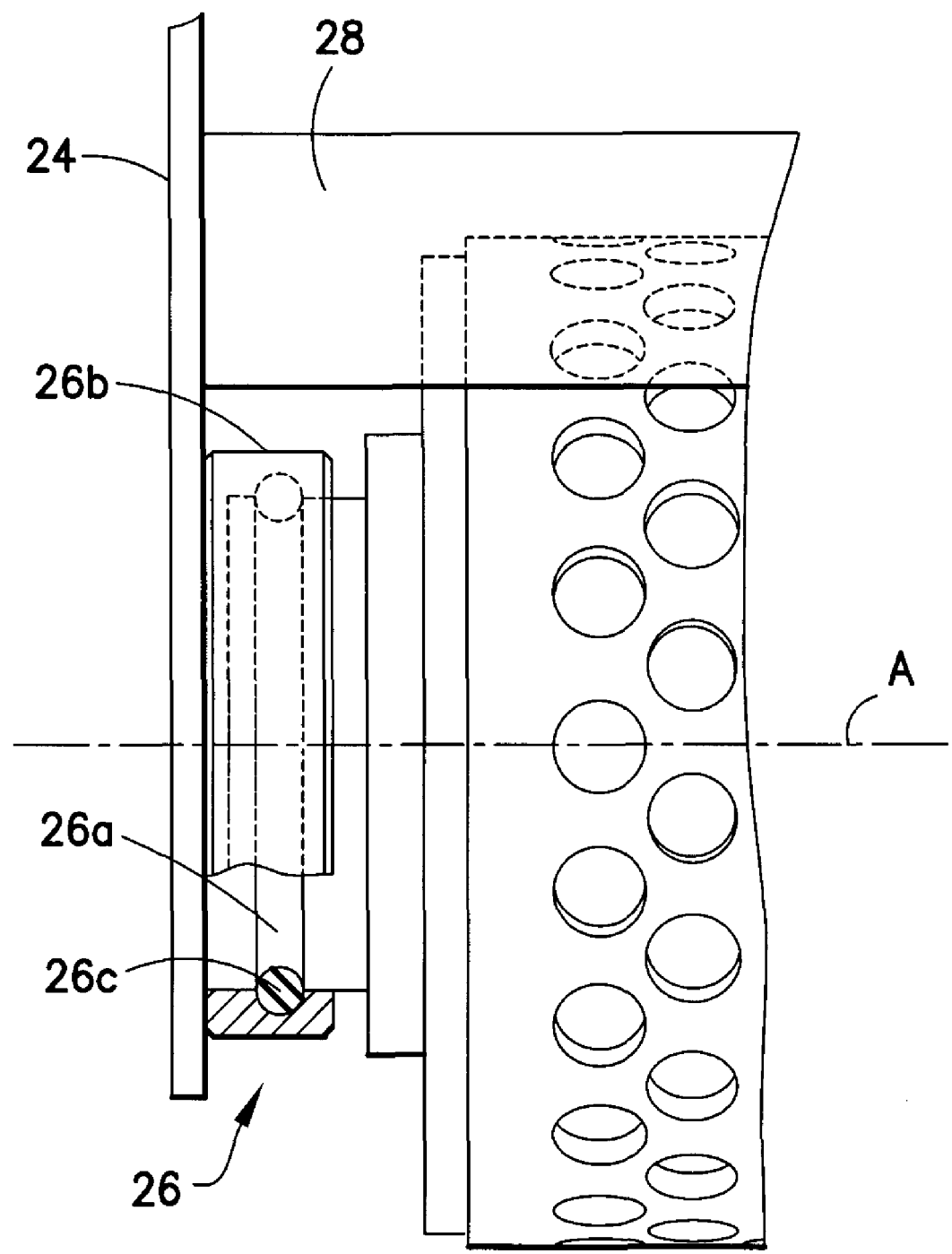
FIG. 2 is a partial view of the floating suction head assembly of FIG. 1, showing the bearing in a partly sectional view.

The strainer 12 is mounted to the gusset member 24 via a rotatable coupling comprising a bearing 26, seen also in FIG. 2. The bearing 26 comprises an inner race 26a and an outer race 26b that together define a raceway for a plurality of rolling elements 26c disposed between the inner race and the outer race. The outer race 26b is mounted on the gusset member 24 and the inner race 26a is formed on the end of the strainer 12 opposite from the coupling portion 16. The bearing 26 permits the strainer 12 to rotate relative to the gusset member 24 and to the float 14 in response to torque received via a hose connected to the strainer. The bearing 26 is situated to permit the strainer 12 to rotate about the central axis A. While FIG. 2 shows the outer race 26b secured onto the gusset member 24 and the inner race formed on the strainer 12, this is not a limitation on the invention, and in other embodiments, the outer race is formed on the strainer and the inner race is on the gusset member. In still other embodiments, other rotatable couplings may be used instead of a bearing 26, such as a mounting pin, journal, bushing, etc.

As shown in FIG. 1, the assembly 10 is floating in a body of water 30. The float 14 rests at the surface 30a of the water, the gusset member 24 extends downward from the float, and the strainer 12 on the gusset member below the float and is fully immersed in the water 30. In this way, the chance that strainer 12 will be exposed to air above the surface 30a and draw air into the hose 20 is substantially reduced. Drawing air into the hose 20 would interfere with a pumping operation because sufficient air can destroy the prime of the pump and may cause surging and/or cavitation. The assembly 10, by keeping the strainer 12 below the water surface, makes it feasible to dispose perforations around the entire circumference of the strainer, so that water can be drawn from around the entire circumference of the strainer. It is therefore possible to draw water through the strainer 12 at a greater rate than through a similarly configured strainer that has perforations only along part of the circumference. On the other hand, the gusset member 24 is preferably configured so that the strainer 12 is not too far below the water surface 30a. In this way, the assembly 10 can reduce the tendency to draw sand, mud and/or debris from the bottom of the body of water 30.

At high rates of water movement into strainer 12 during a pumping operation, there is a possibility of forming a vortex in the water 30 that funnels down from the surface 30a to the strainer. Should such a vortex form, air might be drawn into the strainer 12 and destroy the prime of the pump that is drawing the water 30. The assembly 10 therefore includes the optional baffle 28 mounted on the float 14. As shown in FIG. 1, the baffle 28 may be mounted on the float indirectly, by being mounted on the gusset member 24. Alternatively, the baffle 28 may be mounted directly on the strainer 12 or on the float 14. The baffle 28 extends along the upper surface of the strainer 12, optionally between the strainer and the float 14. The assembly 10 is configured so that when the float 14 is floating on the water 30, the baffle 28 will be disposed below the water surface 30a, between the water surface and the upper part of the strainer 12. Preferably, the baffle 28 is a non-perforated structure. The baffle 28 is disposed at a distance from the strainer 12 to permit water to flow between the baffle and the strainer and to be drawn into the strainer and the hose 20. The baffle 28 disrupts the formation of a vortex in the water between the strainer 12 and the water surface 30a. In this way, the baffle 28 will help prevent the introduction of air into the strainer 12 and help maintain the prime of the pump that is used to draw water via the assembly 10.

As seen in FIG. 1, the gusset member 24 has a flat, single plate configuration, and the baffle 28 is mounted on the gusset member. In an alternative arrangement illustrated in FIG. 3, a gusset member comprises two parts 24a and part 24b, and the baffle 28 is disposed between the parts 24a and 24b. The first part 24a connects the baffle 28 to the float 14, and the second part 24b is connected to the baffle 28 and provides a mounting point for the strainer 12.

In use, a hose 20 is attached to the assembly 10 at the coupler 18, and the assembly 10 is then placed in the body of water 30. When the strainer 12 has settled under the surface 30a, the pumping operation can begin. Water is drawn into the hose 20 via the strainer 12, which prevents objects bigger than the perforations from entering the hose. The baffle 28 prevents the formation of a vortex in the water to ensure that no air is drawn into the hose 20.

Figure 5:
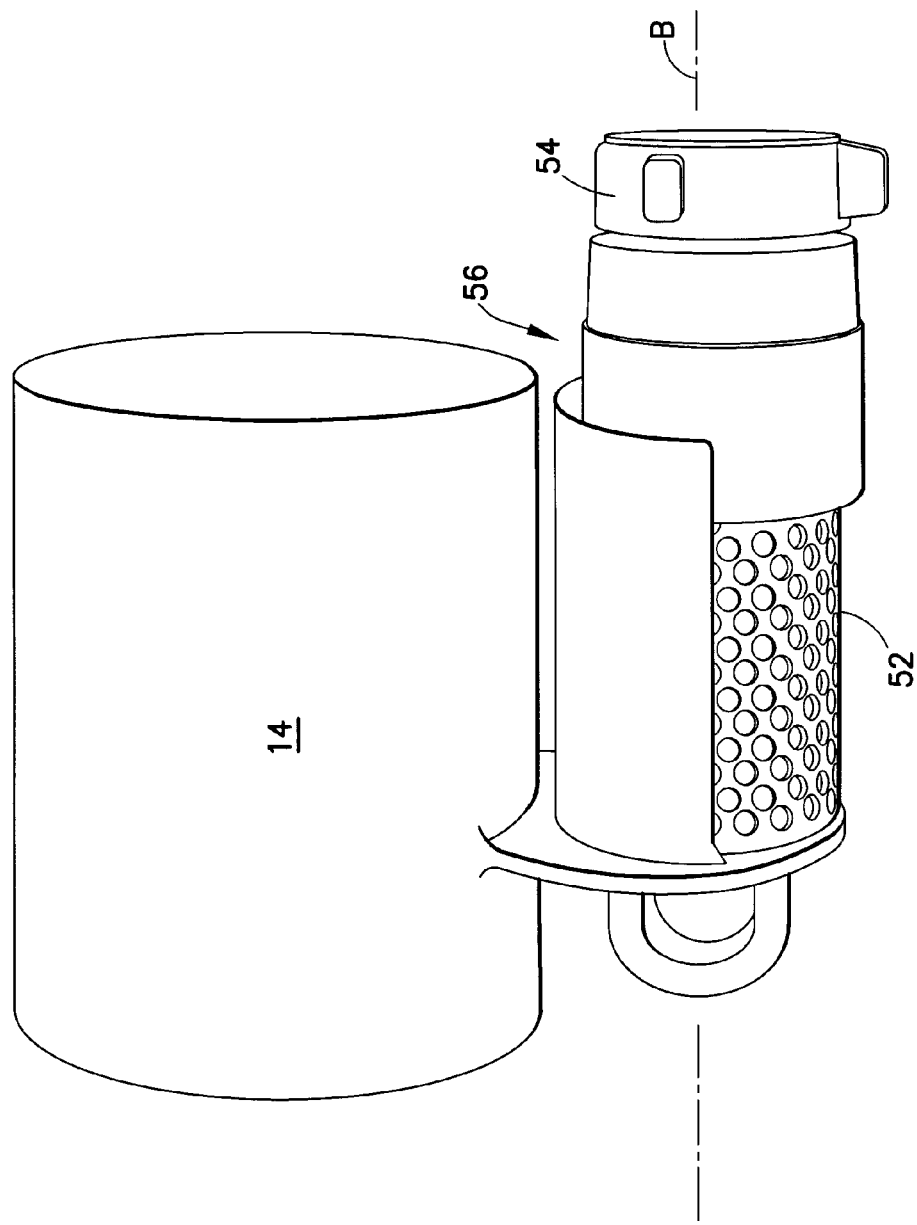
FIG. 5 is a side view of a comparative prior art floating suction head assembly.
Figure 6:
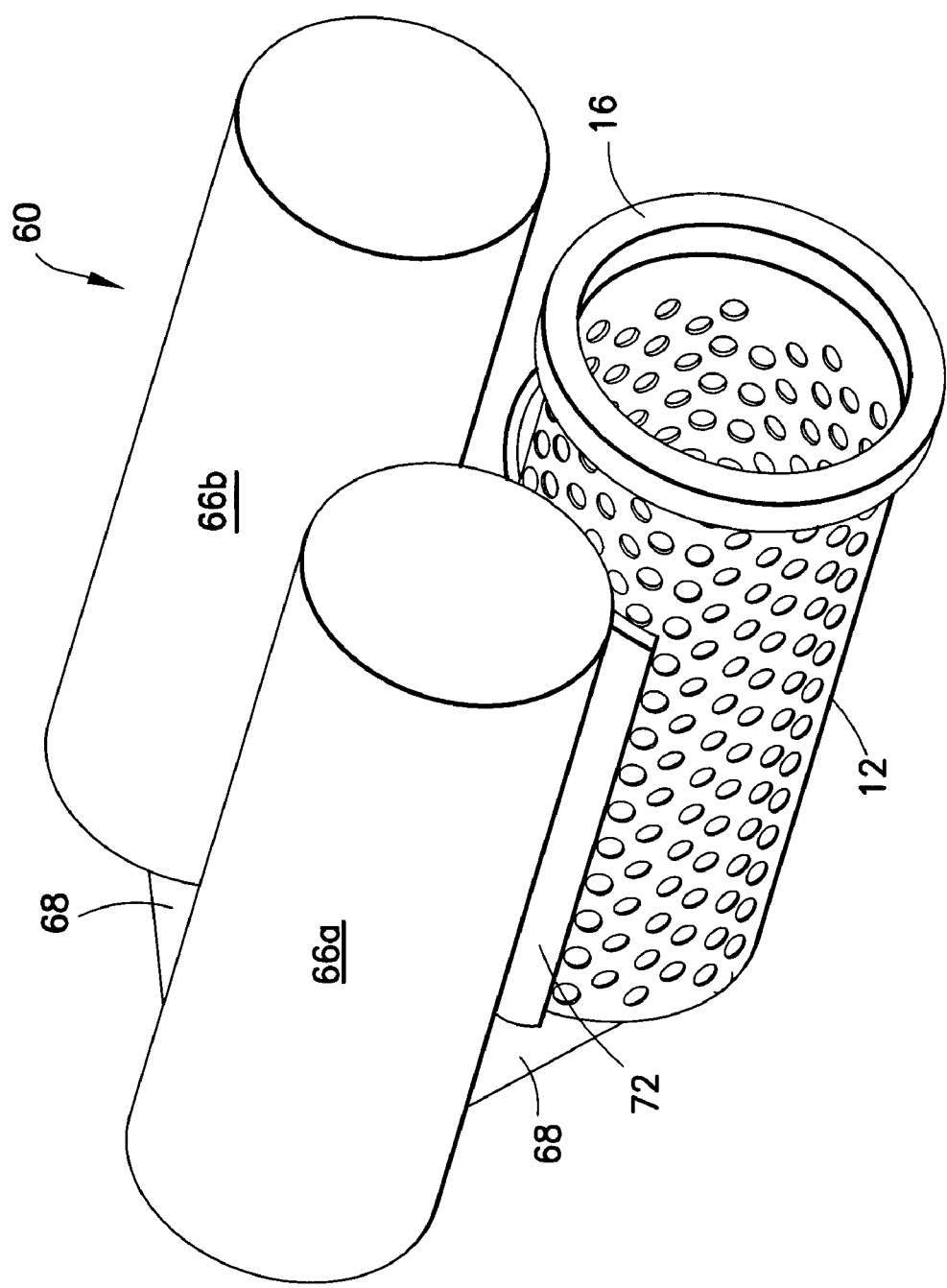
FIG. 6 is a schematic perspective view of a floating suction head assembly according to another embodiment of the invention.
Figure 7:
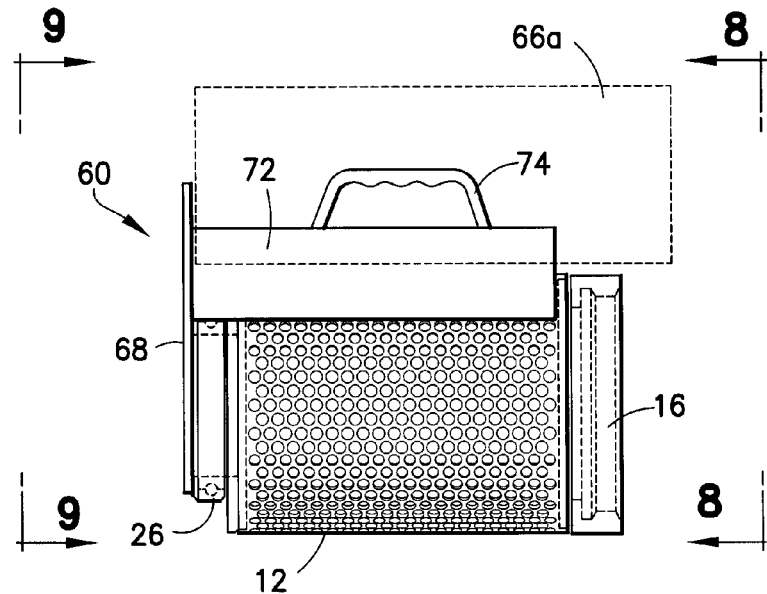
FIG. 7 is a side elevation view of the assembly of FIG. 6 drawn with one float in phantom to reveal the handle.
Figure 8:
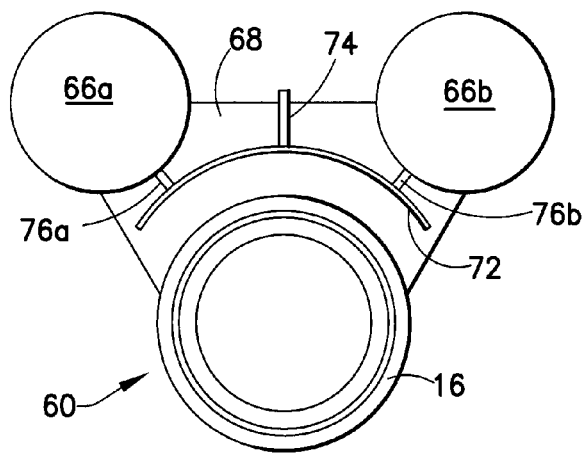
FIG. 8 is a front end elevation view of the assembly of FIG. 6.
Figure 9:
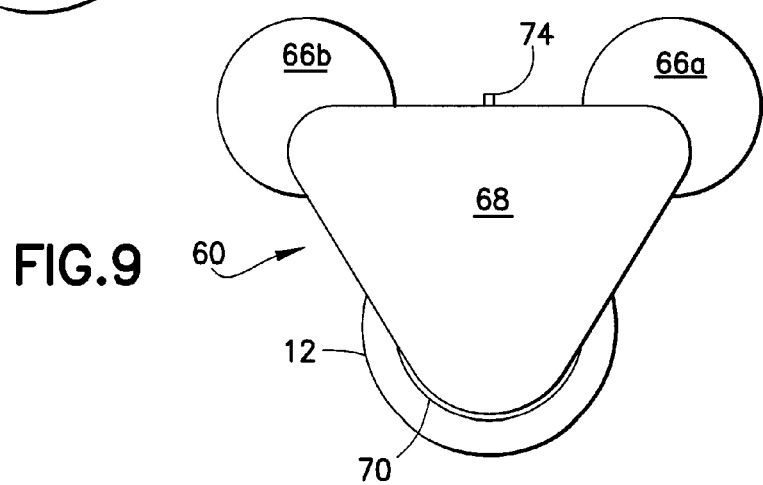
FIG. 9 is a back end elevation view of the assembly of FIG. 7.

In a comparative prior art assembly shown in FIG. 5, a floating suction head assembly 50 comprised a strainer 52 fixedly mounted on a float 14 via a gusset member 24. The strainer 52 had a coupling portion 56 where a coupler 58 is mounted for receiving a hose 20. The coupler 58 was mounted on the strainer 52 by a bearing (not shown). The bearing (not shown) permitted the coupler 58 to rotate relative to the strainer 112 (around axis B) in response to torque received via a hose (not shown) connected to the coupler 58. However, it was found that placing the bearing (not shown) at the coupler 58 made the formation of a seal between a hose (not shown) on the coupler 58 and the strainer 52 difficult to attain and difficult to maintain. By placing the bearing instead at the other end of the strainer, as shown herein, surprisingly improved performance was achieved.

An alternative embodiment of a floating suction head assembly according to this invention is shown in FIGS. 6-9. The floating suction head assembly 60 (hereinafter, "assembly 60") comprises a strainer 12 secured to two buoyant floats 66a and 66b via a gusset member 68 on which the strainer and the floats are mounted. The strainer 12 is mounted on the gusset member 68 via a rotatable coupling that comprises a bearing 26 (FIG. 7), and the strainer includes the coupling 16 for receiving a hose. The strainer 12 and the two floats 66a and 66b are mounted on the gusset member 68 in a triangular configuration.

A baffle 72 is mounted at one end on the gusset member 68 and extends along the upper surface of the strainer 12, i.e., along the portion of the strainer surface that faces towards and towards the space between the strainers 66a and 66b. Two support plates 76a and 76b (FIG. 8) extend from the floats 66a and 66b to further support the baffle 72 on the assembly 60. The clearance between the baffle 72 and the surface of the strainer 12 is sufficient to avoid creating significant resistance to the flow of water through the strainer and into a hose attached to the assembly 60. For example, a clearance of about 1.4 inch (e.g., 1.375 in.) will be adequate for many purposes, although other clearances can be chosen to suit the intended use of the assembly 60 by one of ordinary skill in the art, without undue experimentation. A carrying handle 74 is mounted on the baffle 72 of the assembly 60 for convenient portage of the assembly. The baffle 72 is otherwise configured similarly to the baffle 28 of the assembly 10, and serves the same function as baffle 28.

When the assembly 60 is placed in water, the two floats 66a, 66b float at the surface of the water on either side of the strainer 12, and the strainer is submerged below and between the floats. Having a float 66a and 66b on either side of the strainer 12 makes the assembly 60 more stable in the water than a suction head assembly having only a single float (such as assembly 10), so the assembly 60 will keep the strainer below the surface of the water even when the water is subject to turbulence (waves) or then torque is transferred to the assembly via the hose in circumstance in which a suction head assembly with just one float would allow the strainer to break the surface, or would allow a vortex to form and draw air into the hose. Accordingly, the assembly 60 will perform more reliably than a suction head assembly with only one float.

Figure 3:
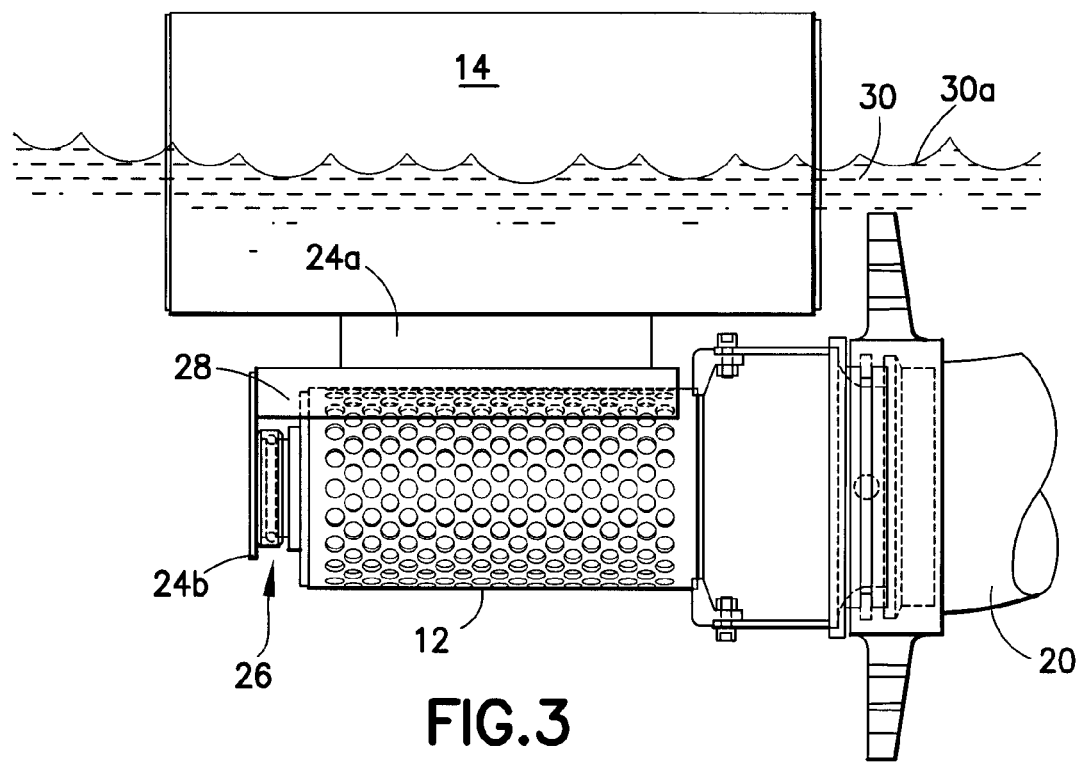
FIG. 3 is a schematic elevation view of a floating suction head assembly according to an alternative embodiment of the invention.
Figure 4:
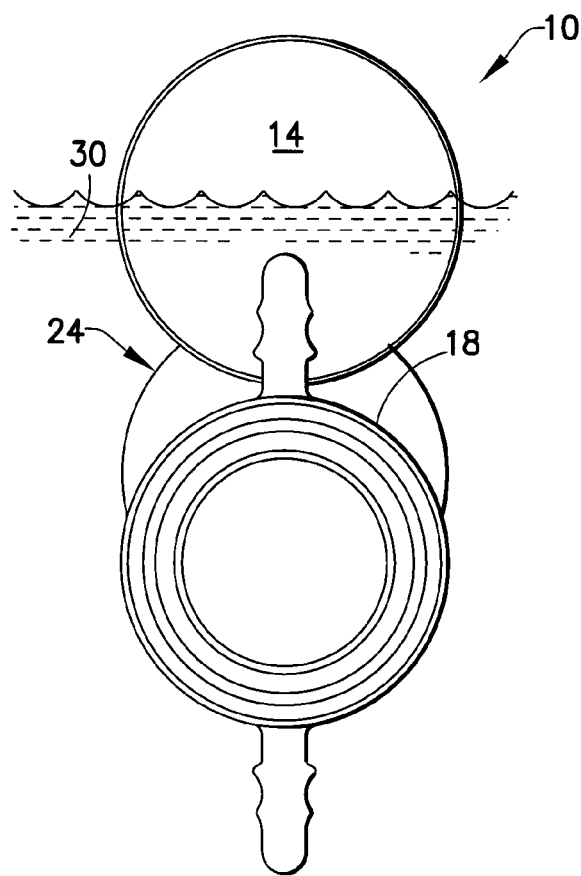
FIG. 4 is an end view of the assembly of FIG. 1.
Figure 10:
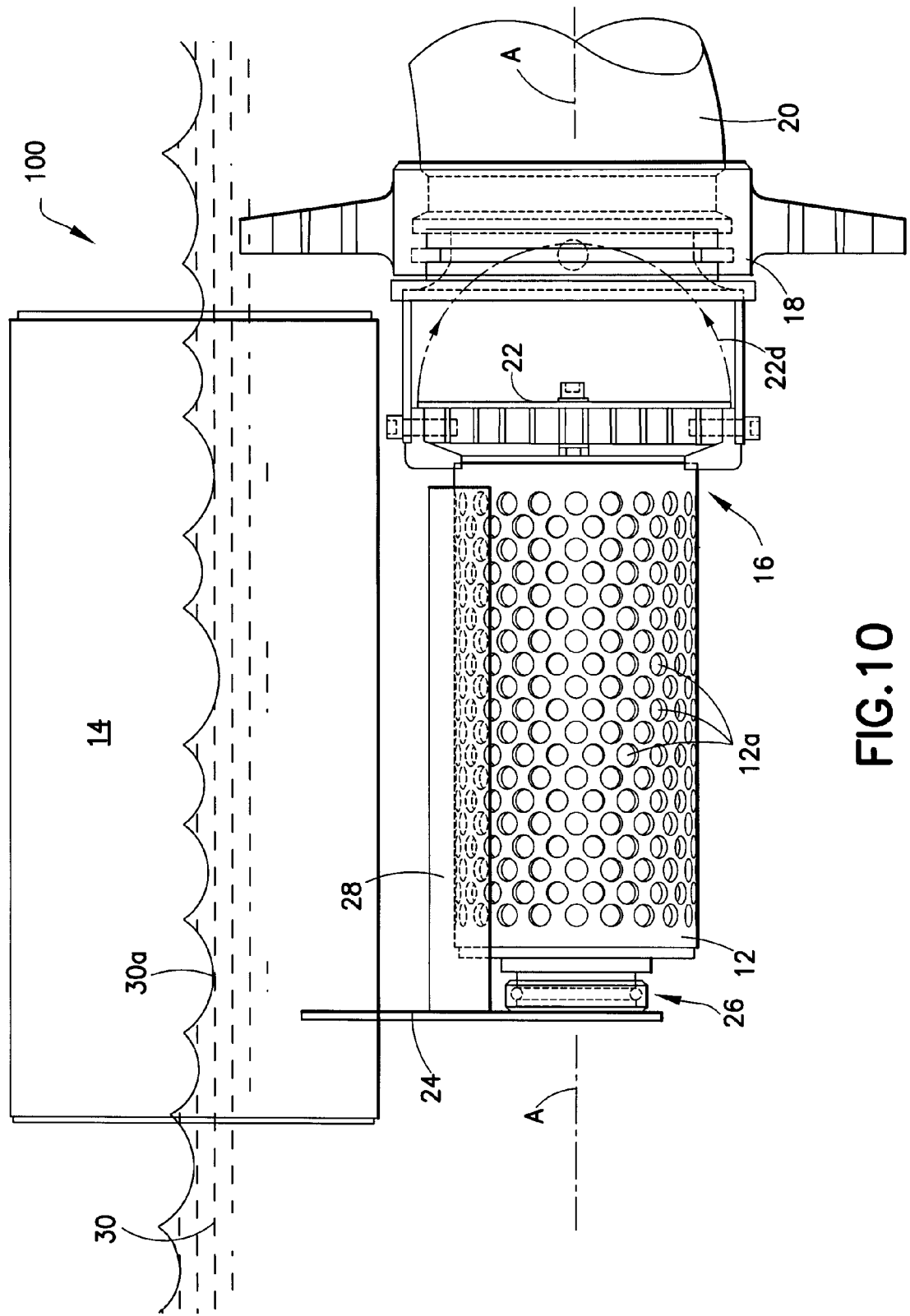
FIG. 10 is a schematic elevation view of a floating suction head assembly including a check valve according to an alternative embodiment of the invention.
Figure 11:
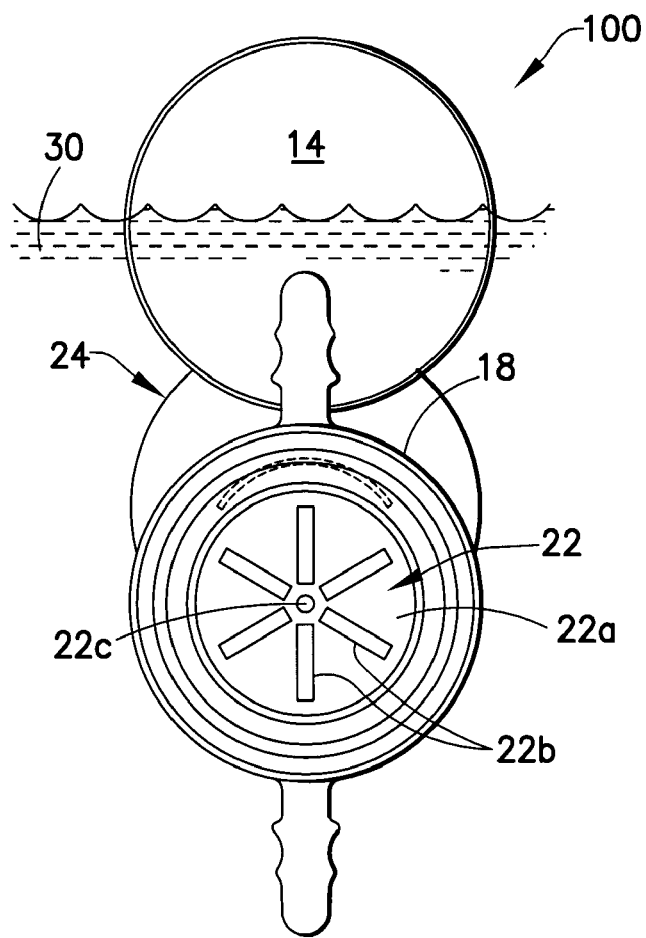
FIG. 11 is an end view of the assembly of FIG. 10, showing the check valve therein.

According to another aspect of this invention, a floating suction head assembly designated generally by the numeral 100 in FIG. 10 includes an optional check valve 22 mounted in the coupler 18, but is otherwise similar to the assembly 10 of FIG. 1. Therefore, corresponding structures in assemblies 10 and 100 bear like reference numerals, and the description of assembly 10 will convey an understanding of the assembly 100 with the following additional explanation concerning the check valve 22. The check valve 22 of the assembly 100 is a collapsible diaphragm-type check valve, that is, a valve that comprises a pliable disc that blocks the outlet of the strainer 12 to backflow from the hose 20, but which collapses to permit substantially un-obstructed flow from the strainer into the hose 20. The check valve 22 is shown in FIG. 11 in the "closed" configuration, that is, the check valve is in position to inhibit backflow from the hose 20 into the strainer 12. The check valve 22 comprises a pliable disc 22a having a plurality of supporting ribs 22b thereon. The disc 22a is supported in the coupler 18 at a central point 22c on the disc. The supporting ribs 22b help open the disc 22a in response to backflow from the hose 10 and ensure that the disc will obstruct the passage through the coupler 18 as shown in FIG. 3, thus inhibiting the backflow from entering the strainer 12. However, when a forward pressure differential develops across the check valve 22, the disc 22a collapses in an umbrella-like fashion (as indicated by arc 22d in FIG. 10) to permit flow from the strainer 12 into the hose 20.

Figure 12:
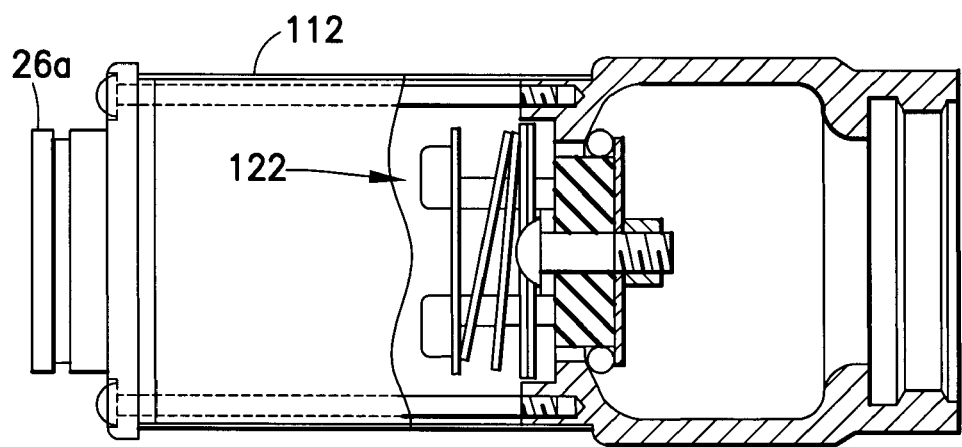
FIG. 12 is a schematic cross-sectional view of a strainer with a poppet-type check valve in an alternative embodiment of the invention.

While assembly 100 includes a diaphragm-type check valve 22, this is not a limitation on the invention, and in other embodiments, any other type of check valve may be employed, for example, a strainer 112, FIG. 12, includes a poppet check valve 122. In still other embodiments, a strainer may include a disc check valve, a swing check valve, etc. The strainer 112 includes an inner race 26a thereon to illustrate that it may be used in assembly 10 or 100, as desired.

The terms "first," "second," and the like, herein do not denote any order, quantity, or importance, but rather are used to distinguish one element from another. In addition, the terms "a" and "an" herein do not denote a limitation of quantity, but rather denote the presence of at least one of the referenced item.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. A floating suction head assembly comprising:
   a float;
   a strainer rotatably coupled at a first end to said float, said strainer extending outwardly in a longitudinal direction from said first end and being cantilevered relative thereto:
   said strainer being rotatable relative to said float about a central longitudinal axis defined by said strainer;
   a coupling portion mounted on a second end of said strainer, said coupling portion defining a bore extending therethrough, said bore being substantially coaxial with said longitudinal axis; and
   said coupling portion being adapted to matingly engage another coupling portion attached to an end of a hose.

2. The assembly of claim 1, further comprising a gusset member extending from the float, wherein the strainer is rotatably mounted to the gusset member.

3. The assembly of claim 2, further comprising a baffle that extends partially around the strainer.

4. The assembly of claim 1, further comprising a baffle connected to the float, the baffle extending partially around the strainer.

5. The assembly of claim 1, further comprising a baffle connected to the float, the baffle extending between the float and the strainer.

6. The assembly of claim 1, further comprising a check valve at the coupling portion of the strainer.

7. The assembly of claim 1, wherein the float comprises a pliable, inflatable floatation sac, a hollow rigid chamber or a solid buoyant material.

8. The assembly of claim 1, wherein the strainer comprises perforations dispersed fully circumferentially around the strainer.

9. The assembly of claim 1, comprising a plurality of floats mounted on a gusset member, and wherein the strainer is rotatably mounted on the gusset member.

10. The assembly of claim 9, further comprising a baffle that extends partially around the strainer.

11. The assembly of claim 10 wherein the baffle is mounted on the gusset member.

\* \* \* \* \*